Aug. 18, 1925.

G. H. ROBINSON 1,550,636

METHOD OF FORMING RUBBER MATS

Filed Nov. 2, 1922

Inventor
G.H.Robinson,
By Marks & Clerk
Attys.

Aug. 18, 1925.　　　　　　　　　　　　　　　　　　　1,550,636
G. H. ROBINSON
METHOD OF FORMING RUBBER MATS
Filed Nov. 2, 1922　　　　4 Sheets-Sheet 2

Inventor
G. H. Robinson,
By Marks & Clerk Attys

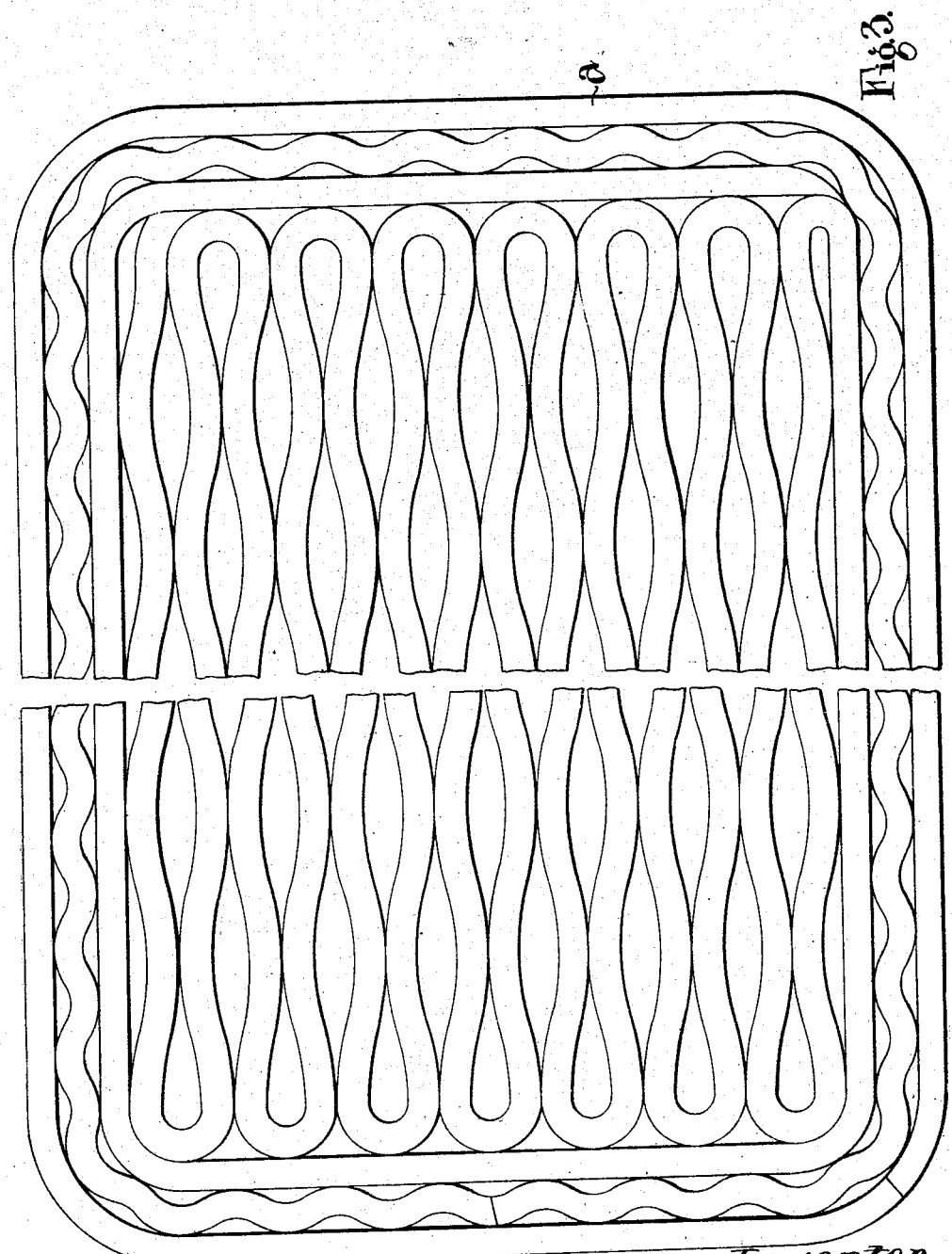

Aug. 18, 1925.
G. H. ROBINSON
1,550,636
METHOD OF FORMING RUBBER MATS
Filed Nov. 2, 1922   4 Sheets-Sheet 4
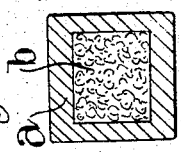
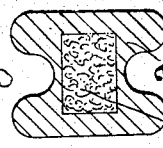
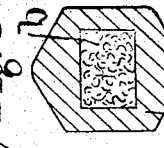
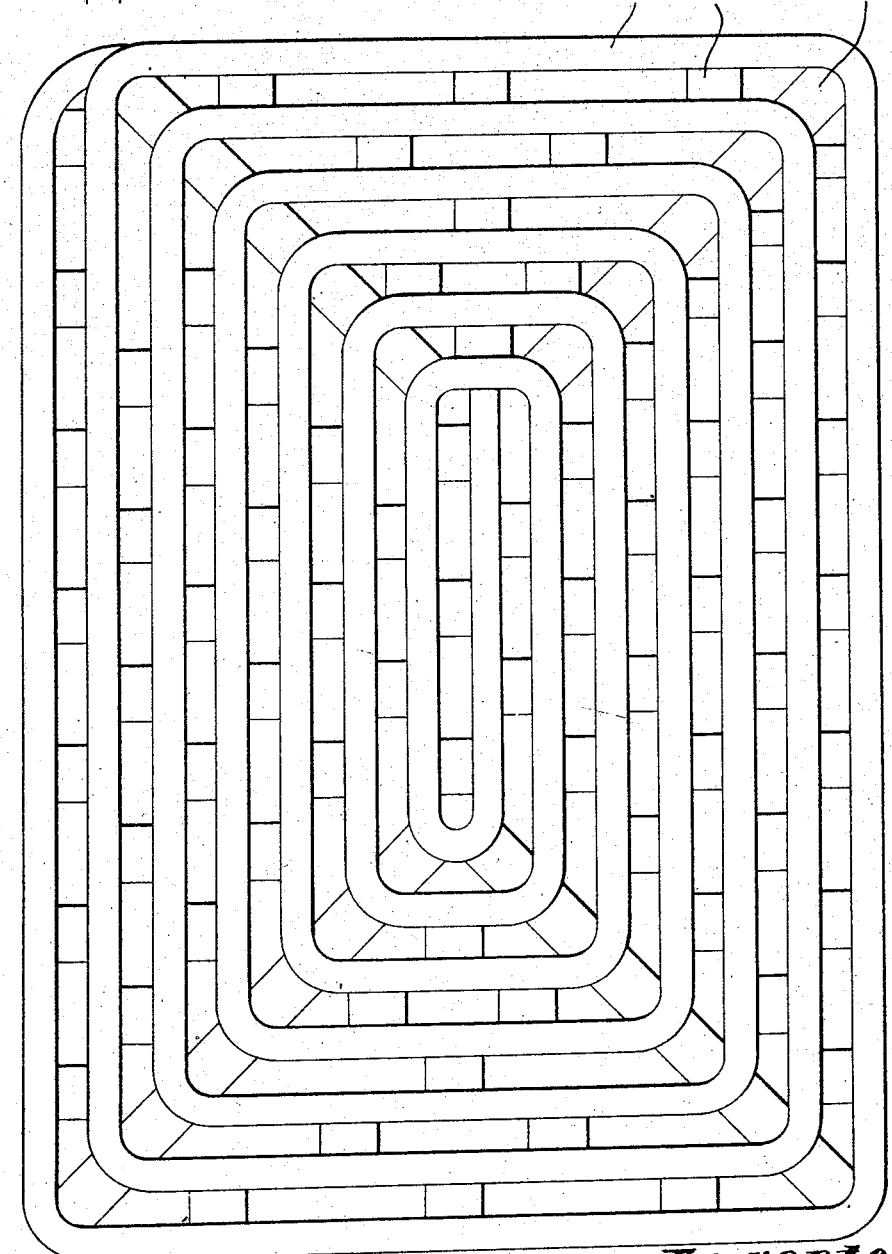
Inventor
G. H. Robinson,
By Marks&Clerk Attys.

Patented Aug. 18, 1925.

1,550,636

UNITED STATES PATENT OFFICE.

GEORGE HUNTER ROBINSON, OF LONDON, ENGLAND.

METHOD OF FORMING RUBBER MATS.

Application filed November 2, 1922. Serial No. 598,618.

*To all whom it may concern:*

Be it known that I, GEORGE HUNTER ROBINSON, a subject of the King of Great Britain and Ireland, and residing at 29 Gracechurch Street, London, E. C. 3, England, have invented certain new and useful Methods of Forming Rubber Mats, of which the following is a specification.

This invention relates to rubber mats and the like and to the manufacture thereof and has for its object to provide a mat of this character which may be more simply and cheaply constructed than those at present in use and which will possess greater wear-resisting properties while at the same time the mat may be of exceedingly light construction and may be varied as to its formation in a great many ways depending upon the purpose for which the same is required.

The invention consists in the manufacture of a rubber mat or the like by extruding a strip of rubber of any size and shape in cross-section and by forming the mat from such extruded strip, the whole being subsequently vulcanized, whereupon contiguous parts of the strip may be made to adhere firmly together thus imparting the necessary strength and degree of rigidity to the mat.

The invention also consists in the manufacture of rubber mats and the like from extruded rubber strip having a core filling or reinforcement of any suitable flexible material such as woven or unwoven hemp, cotton, flax or other fibre, paper pulp or ground cork incorporated with a light flexible binding medium or other suitable material.

The invention also consists in rubber mats or the like produced according to the above methods of manufacture.

In the accompanying drawings:—

Figures 1, 2, 3 and 4 are plan views showing four different forms of mat in accordance with the invention;

Figures 5, 6 and 7 are views showing various sections of strip.

Figure 1:
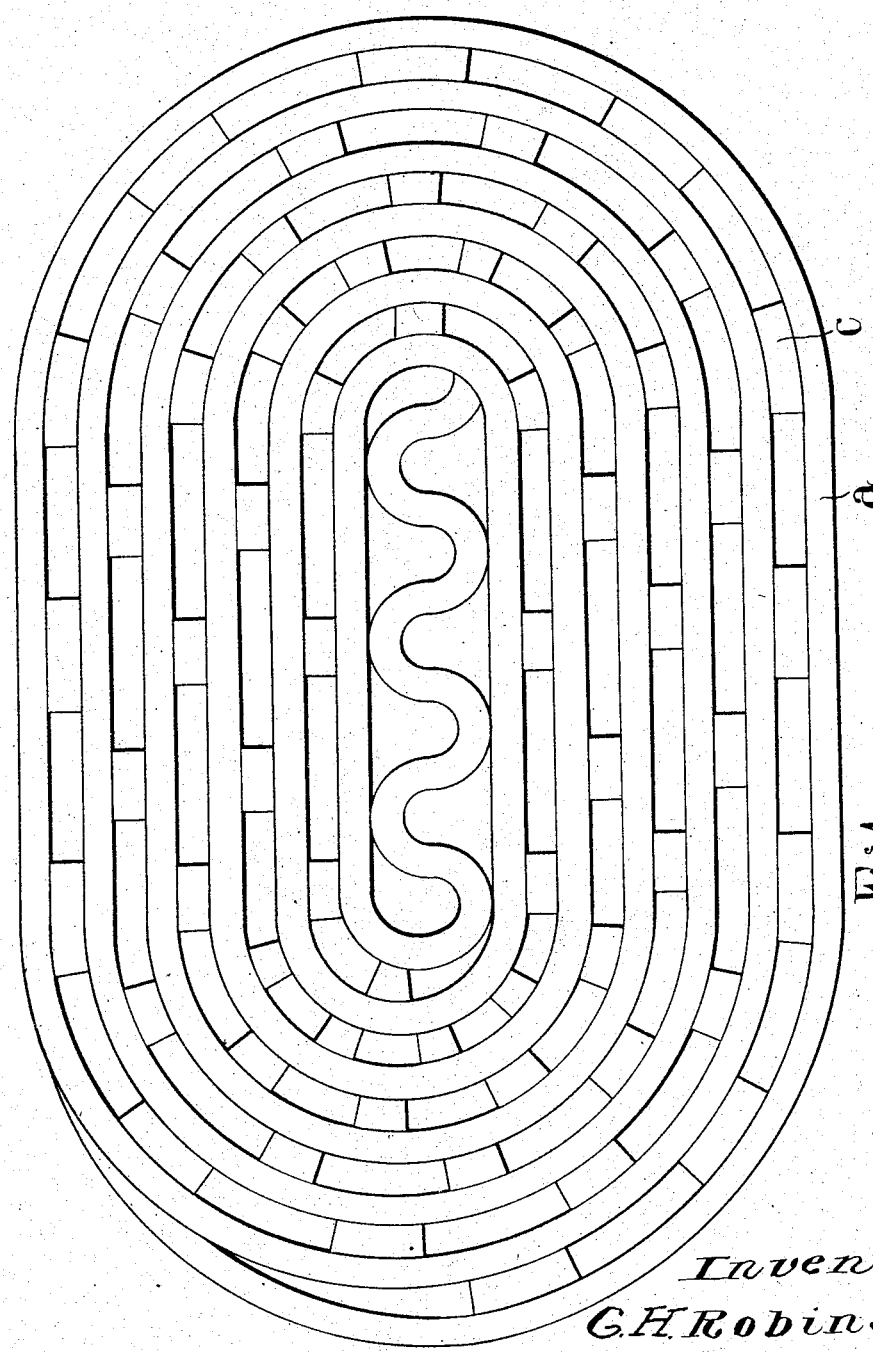
Figure 2:
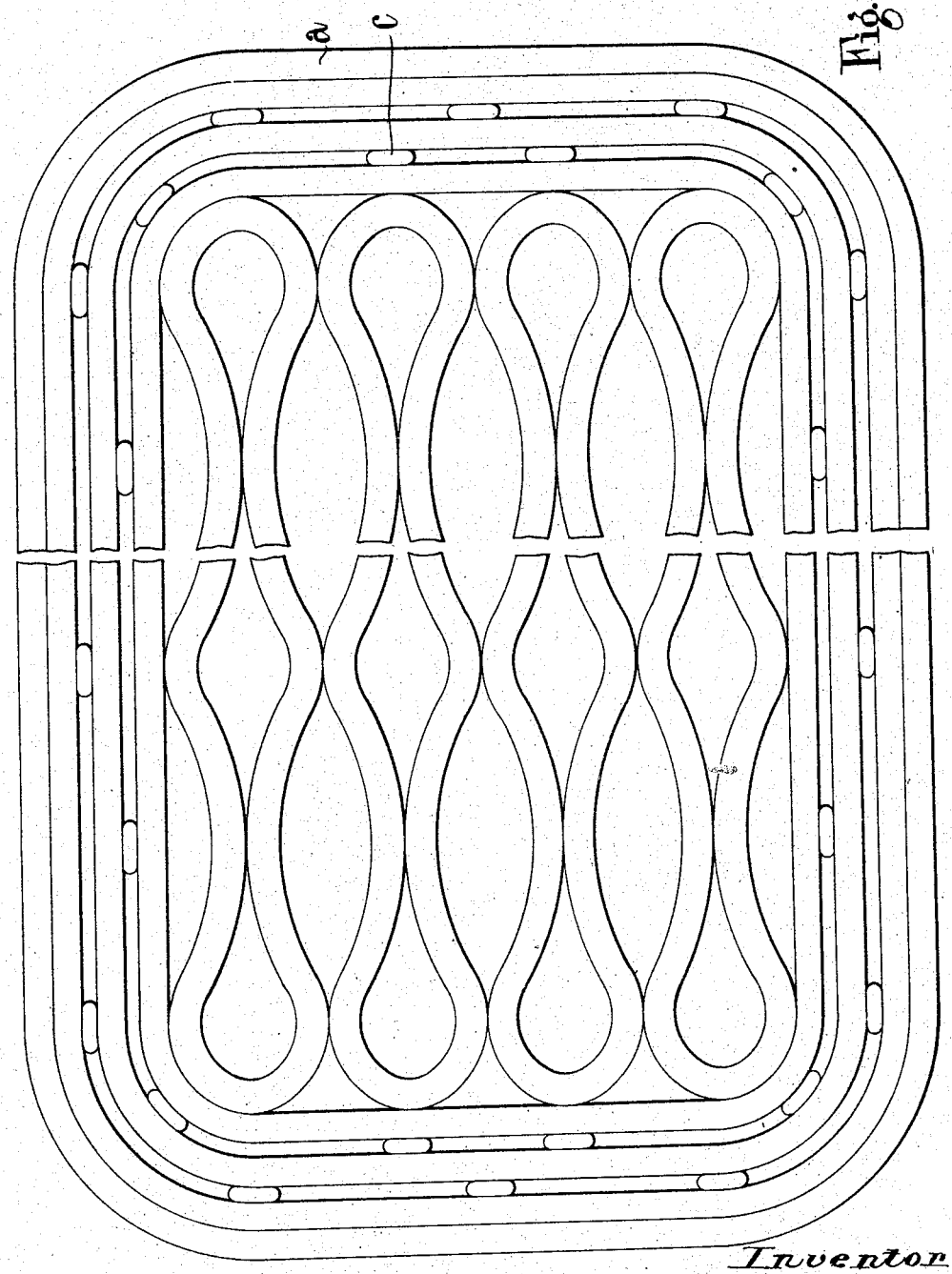

In carrying my invention into effect in one convenient manner, I form my improved reinforced rubber strip *a* by the aid of any suitable extruding machine from which the rubber and reinforcing material *b* are extruded together in such a manner that the reinforcement forms a core to or is surrounded by the rubber so that in this way I am enabled to produce any desired length of strip which may be of any suitable size and shape in cross-section depending upon the size and shape of die employed in connection with the extruding machine.

The reinforced rubber strip of a length suited to the size of mat that is to be made up is then passed around formers in such a manner as to give any shape, form, pattern and size of mat required, there being, for example, several turns of strip to form the outer edge of the mat and having a number of looplike or other portions forming the central part of the mat, it being evident, however, that the invention is not to be limited to any particular manner in which the strip is coiled or otherwise disposed to form the mat.

It is preferable to form the mat from a single continuous strip although it will be clear that more than one strip may be employed if desired and the whole may be vulcanized in any suitable apparatus so that contiguous parts of the strip will be made to adhere firmly to one another and it will be obvious that any blocks, distance-pieces *c* or other like devices that may be required may be incorporated between adjacent turns, coils or lengths of strip according to the character of mat that is required.

Furthermore, the surface of the mat may be formed with any suitable grooved, corrugated or other form of tread which will be produced by means of the extruding die during the extruding operation.

It will be clear that a mat produced in this manner will be lighter than the ordinary punched or moulded rubber mats at present in use while at the same time it will have considerably greater strength and wear-resisting properties, for should the rubber crack or break as it frequently does in ordinary rubber mats the reinforcing cord will serve to keep the parts together and the mat will thus have a considerably longer life than those hitherto adopted.

When using the ground cork core this may, if desired, be of relatively large cross-section as compared with the total cross-section of the strip, so that the strip so produced may be made up into mats which can be used on board ship and which, owing to their extreme buoyancy, may be employed as life-saving belts, rafts and the like, it being obvious that they may be made of any desired size for the support of one or more persons in the water.

Such ground cork or like core may be in itself reinforced by means of hemp or other suitable reinforcement.

It will be understood that the foregoing details are given by way of illustration and not of limitation, as the size, shape and pattern or ornamentation of the mat or like article, the manner in which the same is made up and the particular shape that may be given to the strip from which the mat is made may be varied according to the particular purpose for which the mat is required or any practical requirements that may have to be fulfilled.

Having now described my invention what I claim as new and desire to secure by Letters Patent is:—

1. A method of forming an openwork rubber mat which consists in extruding a continuous strip comprising rubber, arranging the continuous strip to form the openwork pattern with parts of the strip contacting with one another at a plurality of points and subsequently vulcanizing the whole to cause adhesion at the contacting parts.

2. A method of forming an openwork rubber mat according to claim 1 in which the strip employed comprises a reinforcing material covered with a rubber sheath.

In testimony whereof I have signed my name to this specification.

GEORGE HUNTER ROBINSON.